(12) United States Patent
Kim et al.

(10) Patent No.: US 11,669,614 B2
(45) Date of Patent: Jun. 6, 2023

(54) ELECTRONIC DEVICE AND CONTROL METHOD THEREFOR

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Dong Uk Kim, Suwon-si (KR); Byung Hoon Kang, Daejeon (KR); Seung Hyun Ha, Suwon-si (KR); Dae Hee Jang, Daejeon (KR); Jin Soo Jang, Daejeon (KR); Seok Hong, Suwon-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 436 days.

(21) Appl. No.: 16/760,679

(22) PCT Filed: Nov. 7, 2018

(86) PCT No.: PCT/KR2018/013475
§ 371 (c)(1),
(2) Date: Apr. 30, 2020

(87) PCT Pub. No.: WO2019/093762
PCT Pub. Date: May 16, 2019

(65) Prior Publication Data
US 2021/0173923 A1 Jun. 10, 2021

(30) Foreign Application Priority Data
Nov. 8, 2017 (KR) .......................... 10-2017-0148241

(51) Int. Cl.
*G06F 12/08* (2016.01)
*G06F 21/55* (2013.01)
(Continued)

(52) U.S. Cl.
CPC .............. *G06F 21/552* (2013.01); *G06F 9/48* (2013.01); *G06F 12/0802* (2013.01);
(Continued)

(58) Field of Classification Search
CPC .............. G06F 21/552; G06F 12/0831; G06F 12/0802; G06F 9/48; G06F 12/1009;
(Continued)

(56) References Cited

U.S. PATENT DOCUMENTS

| 5,737,569 A | 4/1998 | Nadir et al. |
| 7,353,319 B2 | 4/2008 | Speier et al. |

(Continued)

FOREIGN PATENT DOCUMENTS

| KR | 10-0953854 | 4/2010 |
| KR | 10-2015-0019845 | 2/2015 |

(Continued)

OTHER PUBLICATIONS

International Search Report for PCT/KR2018/013475 dated Feb. 19, 2019, 7 pages with English Translation.
(Continued)

*Primary Examiner* — Hua J Song
(74) *Attorney, Agent, or Firm* — Nixon & Vanderhye, P.C.

(57) ABSTRACT

An electronic device is disclosed. An electronic device comprises: a first memory in which an operating system and an application program executed on the operating system are stored; a second memory; a processor for loading at least some codes among codes corresponding to an application program from the first memory to the second memory, and
(Continued)

when access information of the codes loaded in the second memory is received from a kernel of an operating system, accessing an area in which the loaded codes are stored, on the basis of the received information and executing the application program; and a snoop for monitoring access to an area in which a preset code, the access of which has been limited, from among codes loaded in the second memory is stored.

11 Claims, 8 Drawing Sheets

(51) Int. Cl.
| | | |
|---|---|---|
| *G06F 9/48* | (2006.01) | |
| *G06F 12/0831* | (2016.01) | |
| *G06F 21/57* | (2013.01) | |
| *G06F 21/62* | (2013.01) | |
| *G06F 12/0802* | (2016.01) | |
| *G06F 12/1009* | (2016.01) | |
| *G06F 12/14* | (2006.01) | |

(52) U.S. Cl.
CPC ...... *G06F 12/0831* (2013.01); *G06F 12/1009* (2013.01); *G06F 12/14* (2013.01); *G06F 21/57* (2013.01); *G06F 21/6218* (2013.01)

(58) Field of Classification Search
CPC ...... G06F 12/14; G06F 21/57; G06F 21/6218; G06F 9/545; G06F 12/1491; G06F 2212/1052
USPC ........................................................ 711/146
See application file for complete search history.

(56) References Cited

U.S. PATENT DOCUMENTS

| | | |
|---|---|---|
| 7,809,922 B2 | 10/2010 | Ueda et al. |
| 8,577,413 B2 | 11/2013 | Kim |
| 9,680,770 B2 | 6/2017 | Davis |
| 10,168,934 B2 | 1/2019 | Cho et al. |
| 2007/0005907 A1 | 1/2007 | Kardach et al. |
| 2014/0250540 A1* | 9/2014 | Balasubramanian ... G06F 21/44 726/29 |
| 2015/0154031 A1* | 6/2015 | Lewis ................... G06F 21/575 713/2 |
| 2016/0299851 A1 | 10/2016 | Mattson, Jr. et al. |
| 2016/0321179 A1 | 11/2016 | Sara et al. |
| 2017/0262383 A1 | 9/2017 | Lee et al. |

FOREIGN PATENT DOCUMENTS

| | | |
|---|---|---|
| KR | 10-1626424 | 6/2016 |
| KR | 10-1679349 | 11/2016 |
| KR | 10-2017-0060815 | 6/2017 |
| KR | 10-2017-0105353 | 9/2017 |
| WO | 2012/135192 | 10/2012 |

OTHER PUBLICATIONS

Written Opinion of the ISA for PCT/KR2018/013475 dated Feb. 19, 2019, 7 pages with English Translation.

Notice of Preliminary Rejection dated Nov. 29, 2021 in Korean Patent Application No. 10-2017-0148241 and English-language translation.

* cited by examiner

ELECTRONIC DEVICE AND CONTROL METHOD THEREFOR

This application is the U.S. national phase of International Application No. PCT/KR2018/013475 filed Nov. 7, 2018 which designated the U.S. and claims priority to Korean Patent Application No. 10-2017-0148241 filed Nov. 8, 2017, the entire contents of each of which are hereby incorporated by reference.

BACKGROUND

The disclosure relates to an electronic device and a control method therefor, and more particularly relates to an electronic device executing monitoring of a memory and a control method therefor.

DESCRIPTION OF RELATED ART

The hacking prevention and security issues regarding software vulnerability have come to the force along recent security accidents frequently occurring such as DDoS or ransomware attack.

Particularly, the research and technical development have been proceeded in order to solve a problem regarding an abnormal memory access bug that penetrates a security area by abnormally accessing a memory provided in an electronic device.

In the related art, important data was secured by verifying a security area at intervals of the predetermined time or at the time of occurrence of events, or executing the verification every time when the reading and writing with respect to a wrong memory space were attempted. The page-fault system or the domain-fault system causes resource consumption of a processor and is also inefficient to monitor a small size of memory, since it is based on page granularity (4 KB) and domain granularity (16 MB).

Thus, it is necessary to develop a security method for blocking an attack attempt of abnormally accessing a memory through separate hardware and preventing performance degradation, even when the number of times of abnormal accesses to the memory is increased, unlike in the related technology.

SUMMARY

The disclosure has been made to solve the aforementioned problems, and an object of the disclosure is to provide an electronic device capable of limiting an access by monitoring a memory by using separate hardware provided in the electronic device, and a control method therefor.

According to an embodiment of the disclosure for achieving such an object, there is provided an electronic device including a first memory storing an operating system, and an application program executed in the operating system, a second memory, a processor configured to load some codes among codes corresponding to the application program from the first memory to the second memory, and based on access information of the codes loaded in the second memory being received from a kernel of the operating system, execute the application program by accessing an area in which the loaded codes are stored, based on the received information, and a snoop configured to monitor access to an area in which a predetermined code, the access to which has been limited, among the codes loaded in the second memory is stored, in which the processor is configured to, based on a first command indicating a start of the predetermined code being executed, transmit a first control signal for stopping the monitoring the access to the area in the second memory in which the predetermined code is stored, to the snoop.

The processor may be configured to, based on a second command indicating an end of the predetermined code being executed, transmit a second control signal for restarting the monitoring the access to the area in which the predetermined code is stored, to the snoop.

The processor may be configured to comprise a cache memory, based on the access to the area in which the predetermined code is stored being executed according to the stop of the monitoring the access to the area in which the predetermined code is stored, store data corresponding to the area in which the predetermined code is stored, in the cache memory, and based on the second command being executed, remove the data stored in the cache memory.

The processor may be configured to operate in a first execution mode based on the operating system or a second execution mode based on a secure operating system (OS), based on a switching code for mode switching being received from the kernel of the operating system according to the execution of the first command in the first execution mode, switch the first execution mode to the second execution mode, and transmit the first control signal to the snoop in the second execution mode.

The switching code may be a secure monitor call (SMC) command executed in the kernel of the operating system, and the kernel of the operating system may transmit the SMC command to a virtual monitor module operating in the second execution mode, and the virtual monitor module may be configured to, based on the SMC command being received, switch the first execution mode to the second execution mode.

The SMC command may include a control signal for transmitting the first control signal to the snoop, and a snoop driver module operating in the second execution mode may be configured to, based on the control signal being received, transmit the first control signal to the snoop based on the control signal.

The processor may be configured to operate in a first execution mode based on the operating system or a second execution mode based on a secure operating system (OS), based on a switching code for mode switching being received from the kernel of the operating system according to execution of a second command indicating an end of the predetermined code in the first execution mode, switch the first execution mode to the second execution mode, and transmit a second control signal for restarting the monitoring the access to the area in which the predetermined code is stored to the snoop in the second execution mode.

The snoop may be configured to, based on the access to the area in which the predetermined code is stored being detected before the first control signal is received from the processor, block the access or generate and store a log regarding the access.

According to another embodiment of the disclosure, there is provided a control method of an electronic device including a first memory storing an operating system, and an application program executed in the operating system, and a second memory, the method including loading some codes among codes corresponding to the application program from the first memory to the second memory, monitoring access to an area in which a predetermined code, the access to which has been limited, among the codes loaded in the second memory is stored, by a snoop included in the electronic device, and based on access information of the codes loaded in the second memory being received from a kernel of the operating system, executing the application program by accessing the area in which the loaded codes are stored based on the received information, in which the executing the application program includes, based on a first command indicating a start of the predetermined code being received, transmitting a first control signal for stopping the monitoring the access to the area in the second memory in which the predetermined code is stored to the snoop.

The executing the application program may include, based on a second command indicating an end of the predetermined code being executed, transmitting a second control signal for restarting the monitoring the access to the area in which the predetermined code is stored to the snoop.

The executing the application program may include based on the access to the area in which the predetermined code is stored being executed according to the stop of the monitoring of the access to the area in which the predetermined code is stored, storing data corresponding to the area in which the predetermined code is stored in a cache memory, and based on the second command being executed, removing the data stored in the cache memory.

The executing the application program may include based on a switching code for mode switching being received from the kernel of the operating system according to the execution of the first command in a first execution mode based on the operating system, switching the first execution mode to a second execution mode based on a secure operating system (OS), and transmitting the first control signal to the snoop in the second execution mode.

The switching code may be a secure monitor call (SMC) command executed in the kernel of the operating system, and the switching to the second execution mode may include transmitting the SMC command to a virtual monitor module operating in the second execution mode by the kernel of the operating system, and based on the SMC command being received, switching the first execution mode to the second execution mode by the virtual monitor module.

The SMC command may include a control signal for transmitting the first control signal to the snoop, and the transmitting the first control signal to the snoop may include, based on the control signal being received by a snoop driver module operating in the second execution mode, transmitting the first control signal to the snoop based on the control signal.

The executing the application program may include based on a switching code for mode switching being received from the kernel of the operating system according to execution of a second command indicating an end of the predetermined code in a first execution mode based on the operating system, switching the first execution mode to a second execution mode based on a secure operating system (OS), and transmitting a second control signal for restarting the monitoring the access to the area in which the predetermined code is stored to the snoop in the second execution mode.

The monitoring may include, based on the access to the area in which the predetermined code is stored being detected before the first control signal is received by the snoop, blocking the access or generating and storing a log regarding the access.

According to still another embodiment of the disclosure, there is provided a computer-readable recording medium storing a computer instruction causing an electronic device to execute an operation when being executed by a processor of the electronic device, in which the operation includes loading some codes among codes corresponding to an application program from a first memory to a second memory, monitoring access to an area in which a predetermined code, the access to which has been limited, among the codes loaded in the second memory is stored, by a snoop included in the electronic device, and based on access information of the codes loaded in the second memory being received from a kernel of the operating system, executing the application program by accessing the area in which the loaded codes are stored based on the received information, in which the executing the application program includes, based on a first command indicating a start of the predetermined code being received, transmitting a first control signal for stopping the monitoring the access to the area in the second memory in which the predetermined code is stored to the snoop.

According to various embodiments of the disclosure described above, it is possible to instantly detect and deal with the attack on a memory of a processor by using a hardware device monitoring access to the memory, without performance degradation or an overhead problem.

DETAILED DESCRIPTION

Figure 1:
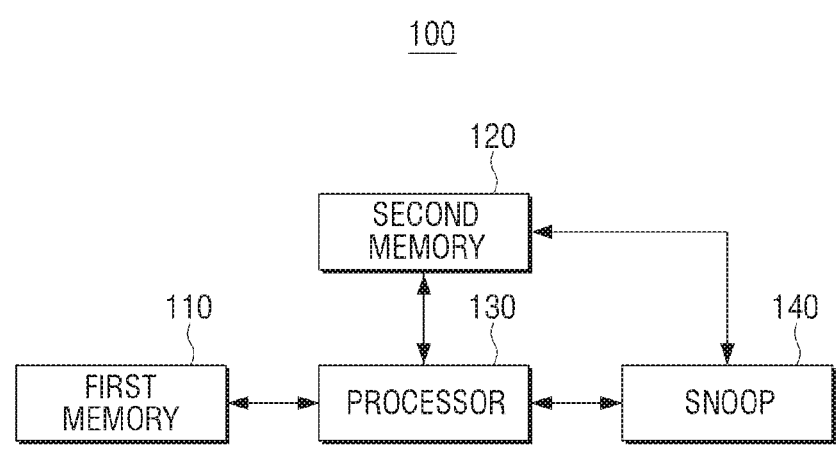
FIG. 1 is a block diagram showing a configuration of an electronic device according to an embodiment.

Hereinafter, various embodiments of the disclosure will be described in detail with reference to the accompanying drawings. In describing the disclosure, a detailed description of the related art or the configuration is omitted when it is determined that the detailed description may unnecessarily obscure a gist of the disclosure. In addition, the following embodiments may be modified to various other embodiments and the scope of the technical spirit of the disclosure is not limited to the following embodiments. Such embodiments are provided to complete the disclosure and to completely convey the technical idea of the disclosure to those skilled in the art.

In addition, the expression "comprising" a certain element does not mean to exclude other elements, but mean to further comprise other elements, unless otherwise noted. Further, various elements and areas in the drawings are schematically shown. Thus, the technical idea of the disclosure is not limited by relative sizes or intervals shown in the accompanying drawings.

FIG. 1 is a block diagram showing a configuration of an electronic device according to an embodiment of the disclosure.

Referring to FIG. 1, an electronic device 100 includes a first memory 110, a second memory 120, a processor 130, and a snoop 140.

The electronic device 100 may be implemented as various types of devices such as a user terminal device, a display device, a set-top box, a tablet personal computer (PC), a smartphone, an e-book reader, a desktop PC, a laptop PC, a workstation, a server, a personal digital assistant (PDA), a portable multimedia player (PMP), or an MP3 player. However, this is merely an embodiment, and the electronic device 100 may also be implemented as various types of devices such as a navigation device, an in-vehicle infotainment device, various medical devices, internet of things, and various sensors.

The first memory 110 and the second memory 120 may store various programs and data necessary for operations of the electronic device 100.

In particular, the first memory 110 may store an operating system (OS) and an application program executed in the operating system in advance.

According to an embodiment, the first memory 110 may be implemented as a non-volatile memory, a volatile memory, a flash memory, a hard disk drive (HDD) a solid state drive (SSD), or a memory card (not shown) (e.g., micro SD card or memory stick) mounted on the electronic device 100, and the operating system and the application program may be stored in the first memory 110 according to the manipulation of a manufacturer or a user of the electronic device 100.

The operating system may indicate a general-purpose operating system that is generally used, and the application program executed in the operating system may indicate a general program executable with support of the general-purpose operating system.

The second memory 120 may be a volatile storage medium and requires power supply for retaining stored information (for example, execution codes and data). For example, the second memory 120 may be implemented as a random access memory (RAM). The second memory 120 may not be limited to the volatile storage medium and may be implemented as a non-volatile memory, flash memory, a hard disk drive (HDD), or a solid state drive (SSD).

Hereinafter, for convenience of description, it is described by assuming that the first memory 110 is implemented as an auxiliary storage device, and the second memory 120 is implemented as a main storage device which stores the operating system and codes, data, commands corresponding to an application program executed in the operating system and on which reading and writing may be performed by the access of the processor 130.

The codes and data stored in the second memory 120 are exposed to malicious hacking and abnormal access, thereby requiring monitoring or securing these.

For this, the electronic device 100 according to an embodiment of the disclosure may monitor codes and data predetermined to be secured among the codes and the data stored in the second memory 120 through the snoop 140 and block the access. In addition, if the access to the codes and data predetermined for the operations of the electronic device 100 are required, the monitoring of the snoop 140 may be stopped or restarted. Hereinafter, the embodiments of the disclosure will be described.

The processor 130 controls general operations of the electronic device 100. The processor 130 may include one or more of a digital signal processor (DSP), a central processing unit (CPU)), controller, an application processor (AP), or a communication processor (CP), and an ARM processor or may be defined as the corresponding term.

In particular, the processor 130 may load at least some codes among codes corresponding to an application program to be executed from the first memory 110 to the second memory 120.

Particularly, the processor 130 may receive access information of a code loaded in the second memory 120 from a kernel of the operating system, access an area in which the loaded code is stored based on the received information, and execute the application program.

The kernel of the operating system is an essential portion of the operating system and may execute functions regarding scheduling of the processor 130, management, input and output management, abstraction, and security of the first and second memories 110 and 120. In particular, the kernel of the operating system may use a virtual memory in order to use a storage area comparatively larger than a storage area of the second memory 120. The virtual memory is not the technical feature of the disclosure, and thus will be described briefly hereinafter.

In order to realize the virtual memory, the kernel may divide the second memory 120 and memory space in a unit of page having a predetermined size and also divide the application program in the unit of page. Such a process is referred to as paging. Hereinafter, for convenience of description, the description will be made by assuming that the size of the page is divided in a code unit. The page is an arbitrary size unit and is not limited to the code unit.

The kernel of the operating system may manage a table showing (or indicating) which area in the second memory 120 a specific code is stored among a plurality of codes constituting the application program. The table herein may include a relationship between a virtual address or a logical address virtually applied regarding a specific code and a physical address or a real address indicating an area in the second memory 120 in which the specific code is stored. The virtual address may be converted into the physical address by a memory management unit (MMU). In the disclosure, the table is expressed as a page table, that is, access information of the code loaded in the second memory 120.

When a specific code is required for executing the application program, the processor 130 according to an embodiment of the disclosure may access an area in which the specific code is stored based on the page table managed by the kernel of the operating system. That is, the processor 130 may receive the access information of the code loaded in the second memory 120 from the kernel of the operating system, access an area in which the loaded code is stored based on the received information, and execute the application program.

The processor 130 according to another embodiment of the disclosure may identify whether or not the corresponding code exists in the second memory 120 based on the information received from the kernel. If the corresponding code does not exist in the second memory 120, the processor 130 may load the corresponding code from the first memory 110 to the second memory, access the loaded code, and execute the application program.

According to an embodiment of the disclosure, the operation of accessing the loaded code by the processor 130 may indicate to include process of executing functions of fetching/recording/editing/removing/updating of the code or the data loaded in the second memory 120 by the processor 130.

The snoop 140 may execute the monitoring of the access to the area in which a predetermined code, the access to which has been limited, among the codes loaded in the second memory is stored.

In particular, the snoop 140 may be connected to a system bus connecting the processor 130 and the second memory 120 to each other and perform the snooping on data traffic.

According to an embodiment, the snoop 140 may receive information of the predetermined code required to be secured from the kernel. The information of the predetermined code herein may include information of the physical address or the real address of the area in the second memory 120 in which the predetermined code is stored. Accordingly, the snoop 140 may monitor the access to the area in the second memory 120 in which the predetermined code is stored.

In another example, if an unintended code is stored due to a bug, the snoop 140 may monitor the corresponding area. For example, the snoop 140 may monitor the access to a code loaded and stored due to a bug, not a code currently required, among the codes corresponding to the application program to be executed. The bug herein may include any actions such as abnormal access or malicious hacking attacks causing the electronic device 100 to operate unintentionally, in addition to a bug generated in the design process of the application program.

When the access to the area in which the predetermined code is stored is detected, the snoop 140 according to an embodiment of the disclosure may block the access or generate a log and store the generated log. The log may indicate data having all of records of the electronic device 100, the system, and the like. For example, the log may be data storing occurrence of errors, notifications, events, or the like of the electronic device 100, performance information, operation history, and the like thereof. It is possible to obtain information regarding detection of abnormal access, malicious attacks, or invasion from the outside with respect to the electronic device 100 and tracking thereof by analyzing the generated log.

The snoop 140 according to an embodiment of the disclosure may be implemented as separate hardware in the electronic device 100. When the snoop 140 is implemented as hardware, the snoop 140 may monitor the predetermined code independently from the second memory 120 or the processor 130, thereby exhibiting excellent performance and reducing generation of overhead of the electronic device 100 or the system, compared to a case of being implemented as software. In addition, it is possible to instantly deal with abnormal access, since the abnormal access to the second memory 120 may be detected in real time. However, there is no limitation thereto, and the snoop 140 may also be implemented as software.

According to an embodiment of the disclosure, it is assumed that a code to be accessed by the kernel of the operating system for executing the application program among the codes loaded in the second memory is a predetermined code. The predetermined code herein may mean a code required to be secured by setting or the like of a distributer or a user of the application program. In such a case, the snoop 140 may monitor the access to the area in which the predetermined code is stored and block even the access to the processor 130, in addition to the abnormal access.

According to an embodiment of the disclosure, when a first command indicating a start of the predetermined code is executed, the processor 130 may transmit a first control signal for stopping the monitoring of the access to the area in which the predetermined code is stored to the snoop 140. When the first control signal is received, the snoop 140 may stop the monitoring of the access. The processor 130 may access the area in which the predetermined code is stored, and the kernel of the operating system may access the predetermined code and execute the application program.

According to an embodiment of the disclosure, the malicious hacking or the abnormal access is attempted to access the area in the second memory 120 in which the predetermined code is stored, without the execution of the first command indicating the start of the predetermined code, and accordingly, the access may be blocked or the log regarding the occurrence of the access may be generated and the generated log may be stored by the snoop 140.

According to an embodiment of the disclosure, when a second command indicating an end of the predetermined code is executed, the processor 130 may transmit a second control signal for restarting the monitoring of the access to the area in which the predetermined code is stored, to the snoop 140. For example, if the processor 130 executed all of the predetermined codes, it is necessary to limit the access to the predetermined code and the area in which the predetermined code is stored.

For this reason, when the second command indicating the end of the predetermined code is executed, the processor 130 may transmit the second control signal to the snoop 140. When the second control signal is received, the snoop 140 may restart the monitoring of the access to the area in which the predetermined code is stored.

The processor 130 according to an embodiment of the disclosure may include a cache memory. The cache memory herein is a temporary storage that temporarily stores codes, data, and the like for logical operations of the processor 130. The cache memory may be expressed as a buffer memory as registers formed of flip-flops.

When the monitoring of the access to the area in which the predetermined code is stored by the snoop 140 is stopped, after transmitting the first control signal to the snoop 140, the processor 130 may access the area in which the predetermined code is stored. In addition, data corresponding to the area in which the predetermined code is stored may be stored in the cache memory.

According to an embodiment, since the data stored in the cache memory is data corresponding to the area in which the predetermined code required to be secured is stored, it is necessary to prevent malicious hacking to the data stored in the cache memory by removing the data temporarily stored in the cache memory after the predetermined code is executed. For this reason, when the second command indicating the end of the predetermined code is executed, the processor 130 may remove the data stored in the cache memory.

The processor 130 according to an embodiment of the disclosure may operate in a first execution mode based on the operating system described above or in a second execution mode based on a secure operating system (OS). The operating system may mean a general-purpose operating system (or normal operating system) that is difficult to be verified but is normally widely used, and the secure operating system may mean an operating system with reinforced security that is sufficiently verified. Hereinafter, for convenience of description, it is assumed that the processor 130 operates based on the general-purpose in the first execution mode and operates based on the secure operating system in the second execution mode.

When the first command is executed in the first execution mode, the processor 130 may receive a switching code for mode switching from the kernel of the operating system.

For example, any one of the first execution mode and the second execution mode may be set as a basic execution mode (default execution mode). When the first execution mode is set as the basic execution mode and a predetermined event occurs in the first execution mode, the kernel of the general-purpose operating system may generate a switching code for switching the execution mode. When the switching code is received, the processor 130 may switch the first execution mode to the second execution mode. The predetermined event herein may be various events such as execution of the first command, the execution of the second command, the reception of the execution mode switching instruction, the execution of an operation to be processed in the secure operating system such as processing of important personal information data or processing of encoded data in the first execution mode, and the like.

The processor 130 may transmit the first control signal described above to the snoop 140 in the second execution mode. That is, the processor 130 switches the execution mode to the second execution mode operating based on the secure operating system according to the switching code generated in the kernel mode of the general-purpose operating system, not in the user mode, and transmits the first or second control signal controlling the snoop 140 to the snoop 140 in the second execution mode, and therefore, it is advantageous that the first or second control signal is not transmitted to the snoop 140 due to the abnormal access. The specific description of the first and second execution modes will be made with reference to FIGS. 5 to 7.

The switching code according to an embodiment of the disclosure may be a command that commands the switching of the execution mode from the first execution mode to the second execution mode. For example, the switching code may be an instruction of switching the execution mode as a SMC (secure monitor call) command executed in the kernel of the operating system. The kernel of the operating system may transmit the SMC command to a virtual monitor module operating in the second execution mode. The virtual monitor module is responsible for access control with respect to the second execution mode, as a module that switches the execution mode of the processor 130 from the first execution mode to the second execution mode, when the SMC command is received. In particular, an inter-process communication (IPC) module included in the virtual monitor module is a module for communication between the first and second execution modes, and may execute a function of interpreting and processing the switching code for communication of any one execution mode with another execution mode. In addition to the case using the SMC command, the processor 130 may also change the mode currently executed to a monitor mode by using an interrupt request (IRQ) or a fast interrupt request (FIQ). In general, the IRQ may be used as an interrupt of the first execution mode and the FIQ may be used as an interrupt of the second execution mode.

The SMC command according to an embodiment of the disclosure may include a control signal for transmitting the first control signal to the snoop 140. When the control signal is received, a snoop driver module operating in the second execution mode may transmit the first control signal to the snoop 140 based on the control signal. When the access to the area in which the predetermined code is stored is detected before the first control signal is received from the processor 130, the snoop 140 may block the access, generate the log regarding the access, and store the generated log.

When the second command indicating the end of the predetermined code is executed in the first execution mode, the processor 130 according to an embodiment of the disclosure may receive the switching code for mode switching from the kernel of the operating system. Accordingly, the processor 130 may switch the first execution mode to the second execution mode and transmit the second control signal for restarting the monitoring of the access to the area in which the predetermined code is stored to the snoop 140 in the second execution mode.

Figure 2:
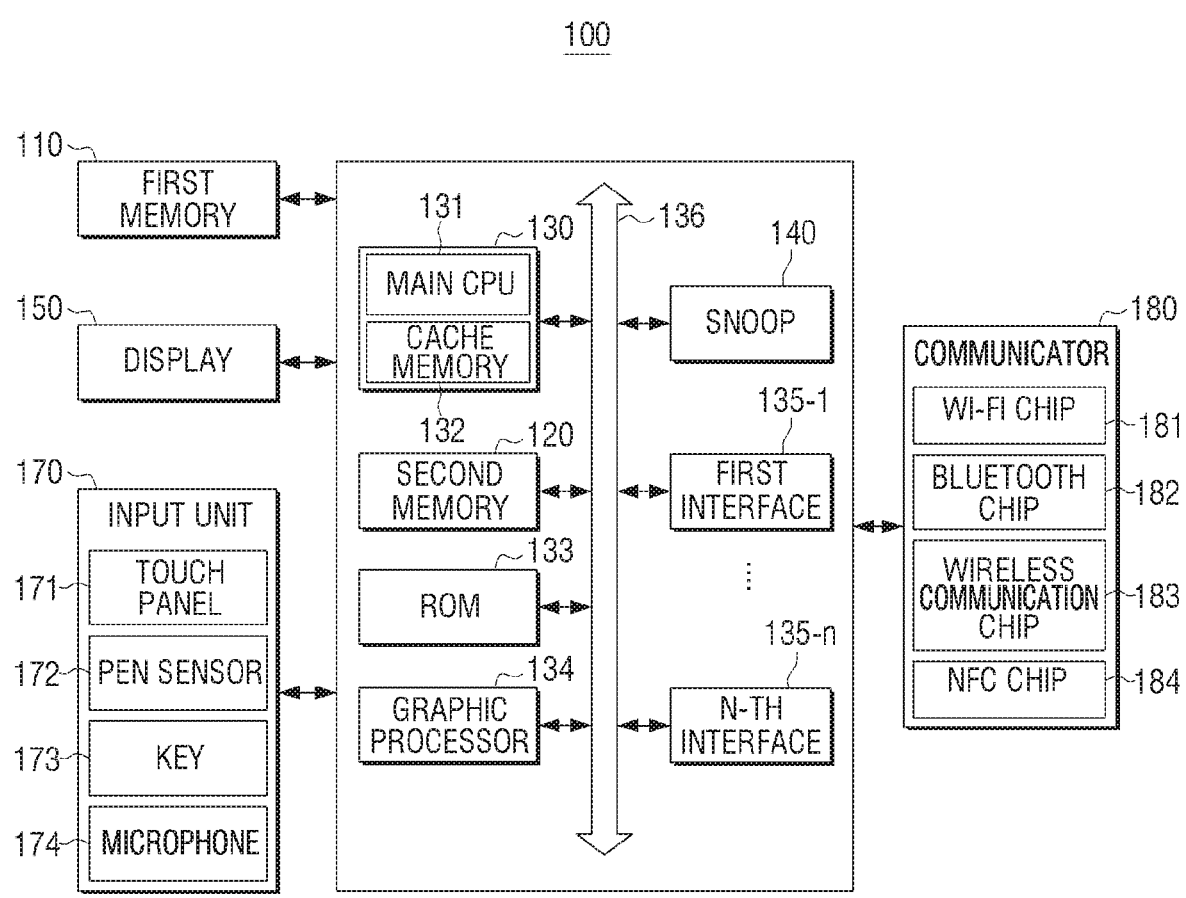
FIG. 2 is a block diagram showing an example of a specific configuration of the electronic device.

FIG. 2 is a block diagram showing an example of a specific configuration of the electronic device 100.

Referring to FIG. 2, the electronic device 100 may include the first memory 110, the second memory 120, the processor 130, the snoop 140, a display 150, a detector 160, an input unit 170, and a communicator 180. The specific description regarding the parts among the elements shown in FIG. 2 overlapped with the elements shown in FIG. 1 will be omitted.

As described above, the second memory 120 may store the operating system and the application program necessary for operations of the electronic device 100. According to an embodiment of the disclosure, when the processor 130 operates in any one of the first and second execution modes, the second memory 120 may store the operating system and the secure operating system.

The processor 130 may generally control the operations of the electronic device 100 by using the operating system and the application program stored in the first and second memories 110 and 120.

Specifically, the processor 130 may include a main CPU 131 and a cache memory 132 and the processor 130 may be connected to the second memory 120, a ROM 133, a graphic processor 134, first to n-th interfaces 135-1 to 135-n, and the snoop 140 via a bus 135.

A set of commands for booting the system are stored in the ROM 133. When the power is supplied by inputting a turn-on instruction, the main CPU 131 copies (or loads) the O/S stored in the first memory 110 to the second memory 120 according to the command stored in the ROM 133 and boots up the system by executing the O/S. When the booting is completed, the main CPU 131 copies various application programs stored in the first memory 110 to the second memory 120 and executes various operations by executing the application programs copied to the second memory 120. The main CPU 131 may execute various operations by using various programs, contents, data pieces stored in the first and second memories 110 and 120.

The graphic processor 134 generates a screen including various objects such as items, images, texts, and the like by using an operating unit (not shown) and a rendering unit (not shown). The operating unit may be an element that calculates attribute values such as a coordinate value of each object to be displayed, a shape, a size, a color and the like thereof according to the layout of the screen by using the control instruction received from the input unit 160. The rendering unit may be an element that generates screens having various layouts including objects based on the attribute values calculated by the operating unit. The screen generated in the rendering unit may be displayed in a display region of the display 150.

The first to n-th interfaces 135-1 to 135-n are connected to various elements described above. One of the interfaces may be a network interface connected to an external device via a network.

The display 150 may display various screens in the display region. For example, the display 150 may display contents such as application execution screens, images, videos, and texts.

The display 150 may be implemented in various forms of display panels. For example, the display panel may be implemented with various display technologies such as a liquid crystal display (LCD), organic light emitting diodes (OLED), active-matrix organic light-emitting diode (AMOLED), liquid crystal on silicon (LCoS), or digital light processing (DLP).

In addition, the display 150 may be combined to at least one of a front region, a side region, or a back region of the electronic device 100 in a form of a flexible display. The flexible display may be twisted, bent, or rolled without damages by using a paper-thin and flexible substrate. Such a flexible display may be manufactured with a plastic substrate, in addition to a glass substrate generally used. If the plastic substrate is used, the display may be formed by using a low-temperature manufacturing processor without using the existing manufacturing processor, in order to prevent a damage on the substrate. In addition, the flexibility for folding and unfolding may be applied by replacing the glass substrate surrounding a flexible liquid crystal with a plastic film. Such a flexible display is thin and light, and is also advantageous since it is able to be twisted and bent to be manufactured in various forms.

If the electronic device 100 according to an embodiment of the disclosure is a small IoT device not including the display 150, the display 150 may be implemented as an external terminal device controlling the small IoT device.

The input unit 170 may include a touch panel 171, a pen sensor 172, a key 172, and a microphone 174 for receiving various inputs. The touch panel 171 may be configured by combining the display 150 and a touch sensor (not shown), and the touch sensor may use at least one type of a capacitive type, a pressure-sensitive type, an infrared type, and an ultrasonic type. In addition to the display function, the touch panel may have a function of detecting even a touch input pressure, in addition to a touch input position and a touched area, and also have a function of detecting not only real touch but also proximity touch. The pen sensor 172 may be implemented as a part of the touch panel 171 and include a separate recognition sheet. The key 173 may include physical buttons, optical keys, or a key pad. The microphone 174 may include at least one of a built-in microphone or an external microphone.

In particular, the input unit 170 may receive an external instruction from the various elements described above and transmit these to the processor 130. The processor 130 may generate a control signal corresponding to the received input and control the electronic device 100.

The communicator 180 may perform communication with an external device. Particularly, the communicator 180 may include various communication chips such as a Wi-Fi chip 181, a Bluetooth chip 182, a wireless communication chip 183, and an NFC chip 184. Each of the Wi-Fi chip 181, the Bluetooth chip 182, and the NFC chip 184 performs communication by a LAN method, a Wi-Fi method, a Bluetooth method, and an NFC method. When using the Wi-Fi chip 181 or the Bluetooth chip 182, various pieces of connection information such as SSID or session key may be transmitted or received first to allow the communication connection by using these, and then various pieces of information may be transmitted and received. The wireless communication chip 183 indicates a chip executing the communication based on various communication standards such as IEEE, Zigbee, 3rd Generation (3G), 3rd Generation Partnership Project (3GPP), and Long Term Evolution (LTE).

An audio processor (not shown) is an element executing processing regarding audio data. The audio processor may execute various processing such as decoding, amplification, noise filtering, and the like regarding the audio data.

An audio output unit (not shown) is an element outputting various alarms or voice messages, in addition to various pieces of audio data subjected to various processing operations such as decoding, amplification, noise filtering by the audio processor. In particular, the audio output unit may be implemented as a speaker, but this is merely an embodiment, and the audio output unit may be implemented as an output terminal that is able to output the audio data.

Figure 3:
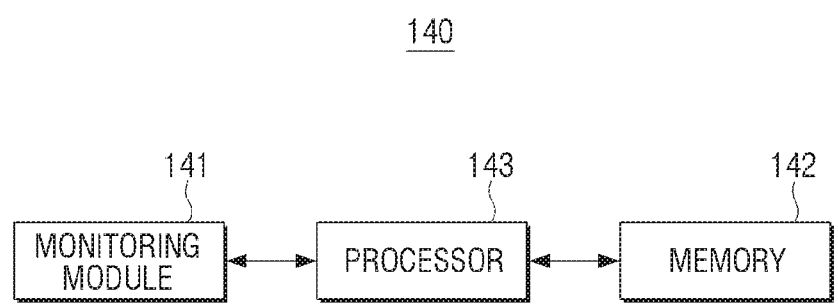
FIG. 3 is a block diagram showing an example of a specific configuration of a snoop.

FIG. 3 is a block diagram showing an example of a specific configuration of the snoop 140.

Referring to FIG. 3, the snoop 140 includes a monitoring module 141, a memory 142, and a processor 143.

The monitoring module 141 may be connected to the system bus between the processor 130 and the second memory 120 of the electronic device 100, and may monitor the access to the area in which the predetermined code is stored, by detecting traffic. For example, the monitoring module 141 may detect an attempt of reading or writing with respect to the area in which the predetermined code is stored.

According to an embodiment of the disclosure, the memory 142 of the snoop 140 may store information of the predetermined code required to be secured, received from the kernel. The information of the predetermined code may include a physical address or a real address of the area in the second memory 120 in which the predetermined code is stored.

The processor 143 of the snoop 140 may control the monitoring module 141 to monitor the access to the area in the second memory 120 in which the predetermined code is stored, based on the information stored in the memory 142.

In particular, when the first control signal for stopping the monitoring is received from the processor 130, the processor 143 of the snoop 140 may control the monitoring module 141 to stop the monitoring the access to the area in which the predetermined code is stored.

According to an embodiment of the disclosure, when the second control signal for restarting the monitoring is received from the processor 130, the processor 143 of the snoop 140 may control the monitoring module 141 to restart the monitoring the access to the area in which the predetermined code is stored. The second control signal may be a signal received from the processor 130 when the execution of the predetermined code ends. Accordingly, the snoop 140 may restart the monitoring to block the abnormal access to the predetermined code and the area in which the predetermined code is stored.

Figure 4:
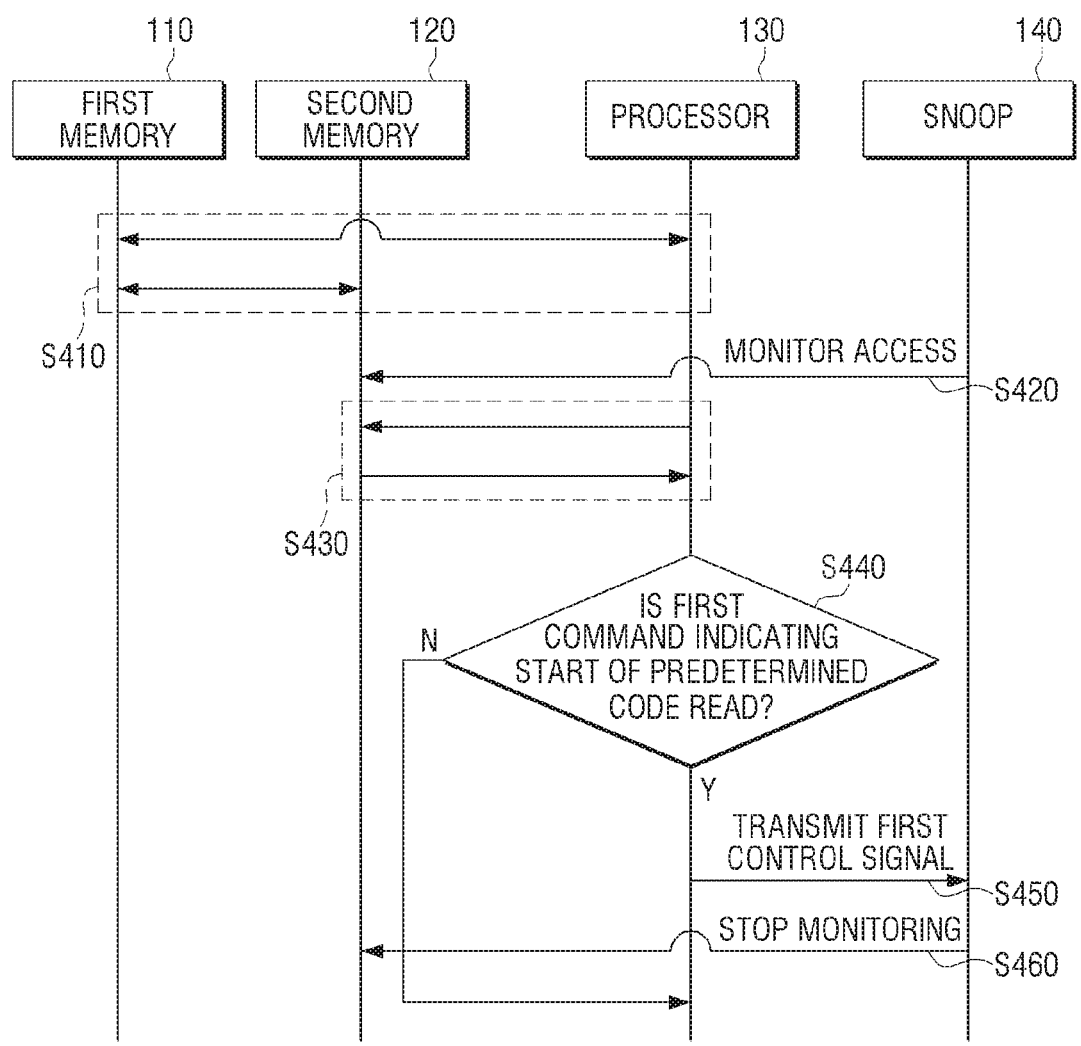
FIG. 4 is a sequence diagram for describing operations of a processor and the snoop according to an embodiment.

FIG. 4 is a sequence diagram for describing operations of the processor 130 and the snoop 140 according to an embodiment of the disclosure.

The processor 130 according to an embodiment of the disclosure may load at least some codes among codes corresponding to an application program to be executed from the first memory to the second memory (S410). The application program may be divided in any unit and the processor 130 may load some pages or some codes among a plurality of pages or codes constituting the application program from the first memory to the second memory.

The snoop 140 may monitor the access to the area in which a predetermined code, among the codes loaded in the second memory, is stored (S420). The predetermined code herein may be a code required to be secured and may be a code, the access to which by the kernel of the operating system is blocked without a normal access request or a monitoring stop request.

When the access information of the code loaded in the second memory is received from the kernel of the operating system, the processor 130 may execute the application program by accessing the area in which the loaded code is stored based on the received information (S430).

In a step of executing the application program, when the first command indicating the start of the predetermined code is executed (S440: Y), the processor 130 may transmit the first control signal for stopping the monitoring of the access to the area in the second memory in which the predetermined code is stored to the snoop 140 (S450).

The predetermined code may be a code the abnormal access to which should be limited as described above. For example, the snoop 140 may monitor and block the access to an area in which a Global Offset Table (GOT) is stored. When dl_resolve( ) or Loader code is executed, the processor 130 may transmit the first control signal for stopping the monitoring of the access to the area in which the GOT is stored to the snoop 140. That is, when dl_resolve( ) or Loader code is executed, the processor 130 may identify that not the abnormal access, but the normal access to the GOT has occurred, and execute reading or writing after stopping the monitoring of the GOT. The GOT herein means a table including addresses of procedures as a table to which a Procedure Linkage Table (PLT) refers.

In another embodiment, in a Thread Local Storage (TLS) area, when _stack_chk_fail( ) code is executed, the processor 130 may execute reading or writing by accessing an area in which a canary value is stored. Specifically, when _stack_chk_fail( ) code is executed, the processor may identify that the normal access to an area in which a canary value is stored has occurred, and transmit the first control signal to the snoop 140. In such a case, the snoop 140 may stop the monitoring of the area in which the canary value is stored.

In still another embodiment, when heap allocator code is executed, the processor 130 may transmit the first control signal to the snoop 140 and the snoop 140 may stop the monitoring of the access to the area in which chunk head is stored. Accordingly, the processor 130 may execute reading or writing by accessing the area in which chunk head is stored.

In still another embodiment, access to an application programming interface (API) (that is, predetermined code) required to be secured in a client API stored in the second memory 120 by the processor 130 is allowed only while the monitoring by the snoop 140 is stopped according to the execution of a command indicating a start and an end of the corresponding API.

The API may be implemented by invoking a function for executing the application program in a language used by the application program when communicating with the operating system in the first execution mode.

According to an embodiment of the disclosure, when the second command indicating the end of the predetermined code is executed, the processor 130 may transmit the second control signal for restarting the monitoring of the access to the area in the second memory in which the predetermined code is stored to the snoop.

Figure 5:
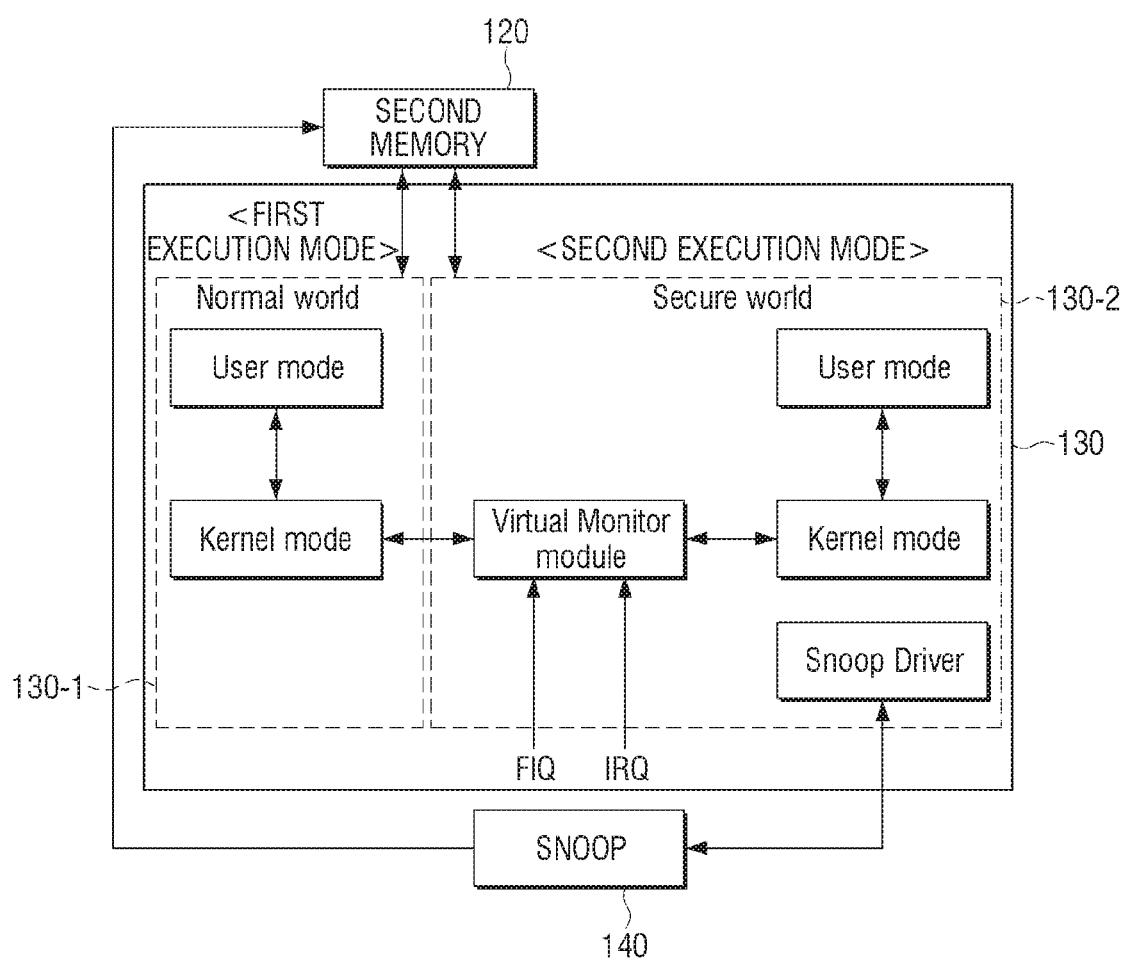
FIG. 5 is a view showing execution modes of the processor according to an embodiment.

FIG. 5 is a view showing the execution modes of the processor 130 according to an embodiment of the disclosure.

According to an embodiment of the disclosure, the processor 130 may selectively operate in one of a first execution mode 130-1 and a second execution mode 130-2. The first execution mode 130-1 is an execution mode based on the general-purpose operating system and the second execution mode 130-2 is an execution mode based on the secure operating system. The first and second execution modes 130-1 and 130-2 may be expressed as a normal world and a secure world, respectively. The normal world may mean general data processing architecture and the secure world may mean data processing architecture ensuring security.

In an embodiment, the processor 130 may use ARM Trustzone Architecture. The "ARM Trustzone Architecture" notifies micro-process including runtime architecture of Arm Limited that is divided into two. A non-secure runtime architecture that is one of the two runtime architectures may be referred to as "Normal Zone" or a "Normal World". The non-secure runtime architecture may operate based on the general-purpose operating system. The other one is a secure runtime architecture and may be referred to as "Trustzone", "Trusted World", or "Secure World". The secure runtime architecture may operate based on the secure operating system.

The general-purpose operating system may be typical and general operating systems, for example, Android, Window, or Symbian. The secure operating system may be an operating system in which a security kernel including integrated security functions is inserted into the existing operating system, for example, MOBICORE or RedCastle. According to the ARM TrustZone, the non-secure runtime architecture and the secure runtime architecture described above may be defined as virtual first execution mode 130-1 and second execution mode 130-2, respectively.

In the processor 130 according to an embodiment of the disclosure, any one of the general-purpose operating system or the secure operating system may be set as a default. For example, if the general-purpose operating system is set as a default, the processor 130 may operate in the first execution mode 130-1 based on the general-purpose operating system, and the processor 130 may switch the execution mode to the second execution mode 130-2, when a predetermined event occurs. In such a case, the secure operating system may be executed in the second execution mode 130-2. The predetermined event may be a mode selection instruction of a user, reception of the switching code or not, generation of mode switching command or not, and the like.

For example, if the predetermined event is the reception of the switching code or not, the processor 130 may switch the first execution mode 130-1 to the second execution mode 130-2, when the switching code for mode switching is received from the kernel of the operating system. The switching code herein is generated at a level of the kernel of the operating system, not a level of a user, and accordingly, it is possible to reduce a risk of generation of the switching code due to the malicious hacking or the abnormal access.

The switching code herein may be an SMC command executed in the kernel of the operating system. The SMC command is transmitted to the virtual monitor module and the virtual monitor module may switch the first execution mode 130-1 to the second execution mode 130-2. When the SMC command is received while the execution mode is the second execution mode 130-2, the virtual monitor module may switch the second execution mode 130-2 to the first execution mode 130-1.

In addition to the case using the SMC command, the processor 130 may also change the mode currently executed to a monitor mode by using an interrupt request (IRQ) or a fast interrupt request (FIQ). In general, the IRQ may be used as an interrupt of the first execution mode 130-1 and the FIQ may be used as an interrupt of the second execution mode 130-2.

In another embodiment, when a user instruction for execution mode selection is received, the processor 130 may switch the execution mode to the execution mode corresponding to the user instruction. For example, when a user instruction for switching the first execution mode 130-1 operating based on the general-purpose operating system to the second execution mode 130-2 is received, the processor 130 may switch the execution mode to the second execution mode 130-2. The second execution mode 130-2 may be an execution mode operating based on the secure operating system.

In still another embodiment, when the general-purpose operating system is executed in the first execution mode 130-1, the processor 130 may shut down and reboot the electronic device 100 and then execute the secure operating system, and the processor 130 may operate in the second execution mode 130-2 based on the secure operating system.

In the embodiment described above, it may be understood that the first execution mode 130-1 and the second execution mode 130-2 executes the operating systems corresponding to the respective execution modes, but if data required to be secured is generated, while executing the general-purpose operating system and the application program operating in the general-purpose operating system, the processor 130 may transmit the corresponding data to the second execution mode 130-2 and the secure operating system.

For example, when the processor 130 accesses a specific address of the second memory 120 for executing the application program operating in the general-purpose operating system and the data corresponding to the address is to be used in the second execution mode 130-2 based on the secure operating system, the processor 130 may transmit the data generated in the first execution mode 130-1 to the second execution mode 130-2 and operate in the secure operating system.

The second execution mode 130-2 may include various software such as a network driver module, TCP/IP module, and the like, separately from the first execution mode 130-1, in order to reinforce the security. In addition, the second execution mode 130-2 may be implemented as hardware independent from the first execution mode 130-1. For example, the first execution mode 130-1 may be implemented as a system on chip (SoC) or a processor different from that of the second execution mode 130-2. However, there is no limitation thereto, and the execution modes may be implemented in two areas logically and virtually divided from one processor.

Figure 6:
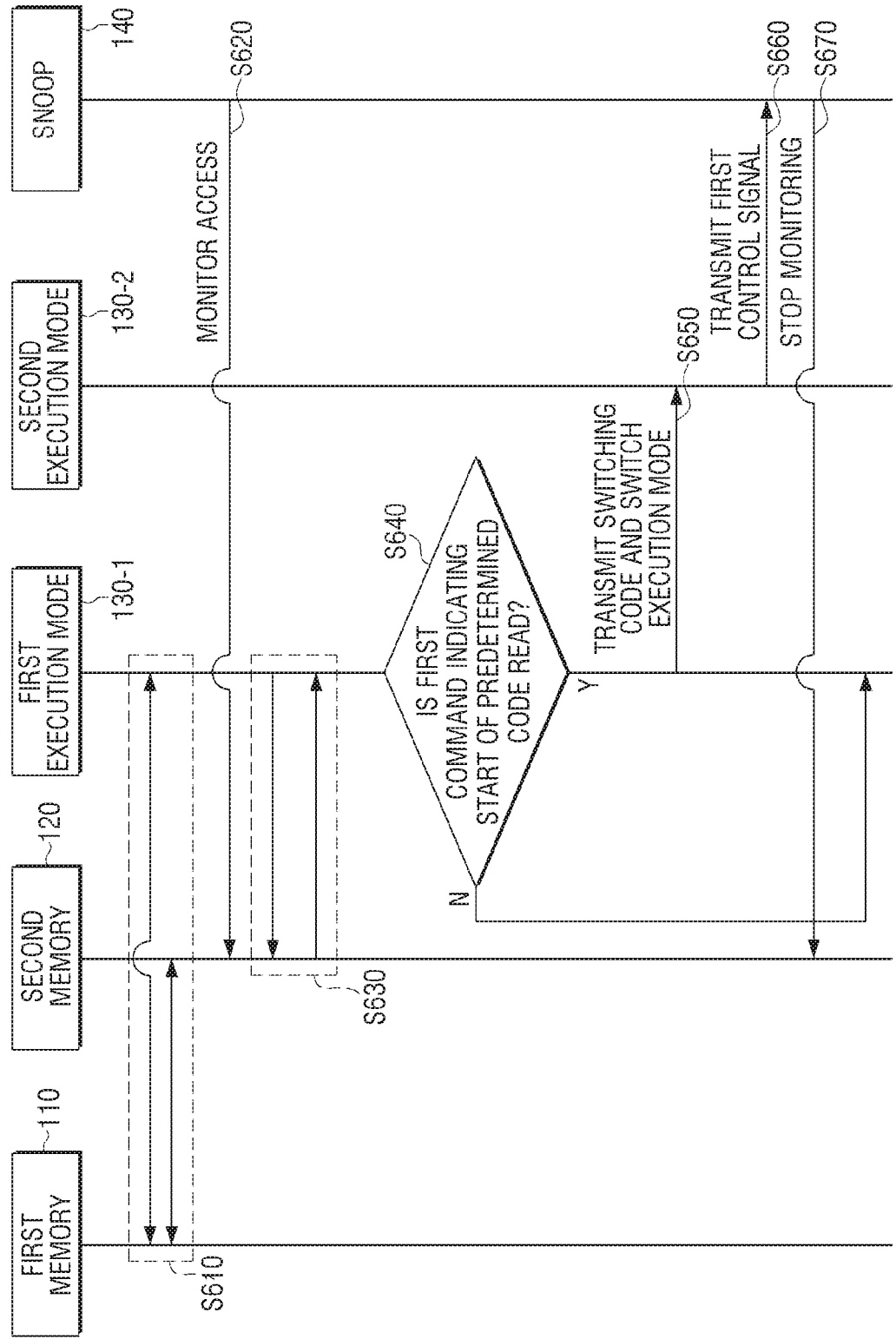
FIG. 6 is a sequence diagram for describing switching of the execution modes according to an embodiment.

FIG. 6 is a sequence diagram for describing switching of the execution modes according to an embodiment of the disclosure.

The processor 130 may according to an embodiment of the disclosure may load at least some codes among codes corresponding to an application program to be executed from the first memory to the second memory (S610).

The snoop 140 may monitor the access to an area in which a predetermined code among the codes loaded in the second memory is stored (S620).

When the access information to the code loaded in the second memory is received from the kernel of the operating system in the first execution mode 130-1, the processor 130 may execute the application program by accessing the area in which the loaded code is stored based on the received information (S630). The operating system herein is the general-purpose operating system and the first execution mode 130-1 may mean the execution mode operating based on the general-purpose operating system.

When the first command indicating the start of the predetermined code is executed (S640: Y), the processor 130 operating in the first execution mode 130-1 may receive the switching code for mode switching from the kernel of the operating system and switch the first execution mode 130-1 to the second execution mode 130-2 (S650). Then, the processor 130 may transmit the first control signal for stopping the monitoring of the access to the area in which the predetermined code is stored to the snoop 140. In particular, the first control signal may be transmitted to the snoop 140 by a snoop driver module operating in the second execution mode 130-2.

Next, the snoop 140 may stop the monitoring the access to the area in the second memory 120 in which the predetermined code is stored. The processor 130 may execute the application program by accessing the area in which the predetermined code is stored, and execute the reading and writing with respect to the corresponding area.

According to an embodiment of the disclosure, when the access to the area in which the predetermined code is stored is detected before the first control signal is received, the snoop 140 may block the access or generate the log regarding the access.

Figure 7:
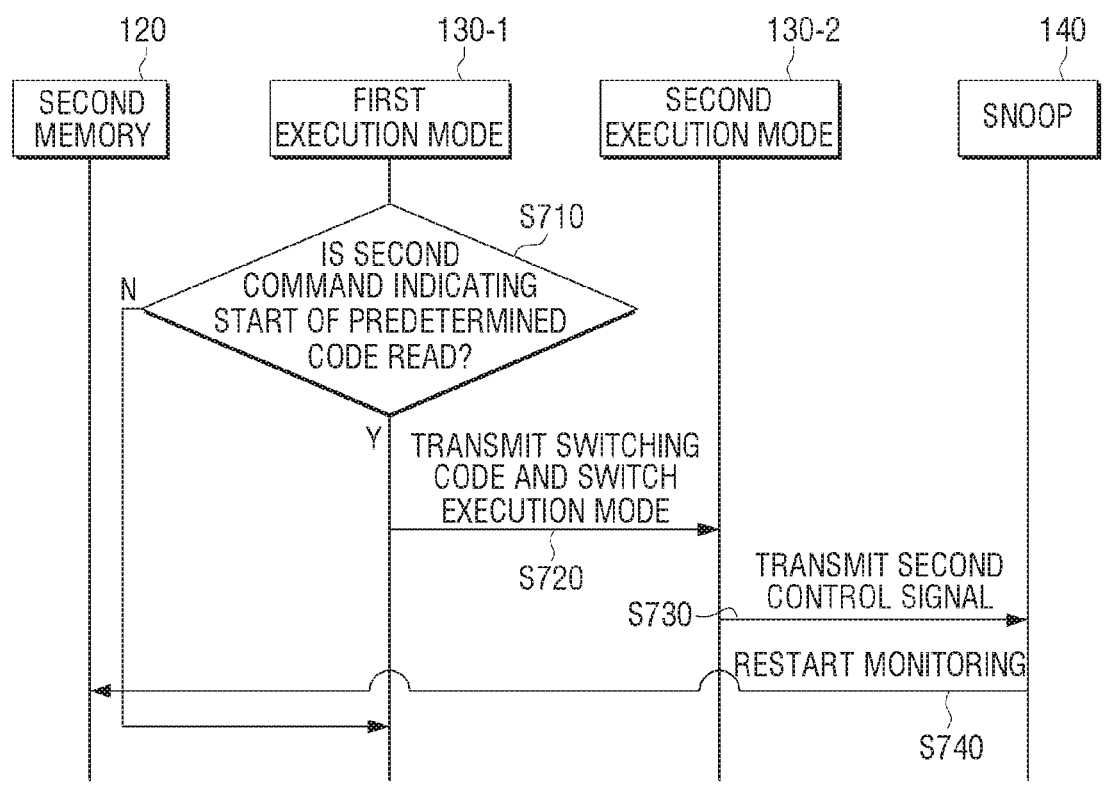
FIG. 7 is a sequence diagram for describing switching of the execution modes according to an embodiment.

FIG. 7 is a sequence diagram for describing the switching of the execution modes according to an embodiment of the disclosure.

When the second command indicating the end of the predetermined code is executed (S710: Y), the processor operating in the first execution mode 130-1 may receive the switching code for mode switching from the kernel of the operating system and switch the first execution mode 130-1 to the second execution mode 130-2 (S720). Then, the processor 130 may transmit the second control signal for restarting the monitoring the access to the area in which the predetermined code is stored to the snoop 140. Accordingly, the snoop 140 may restart the monitoring the access to the area in the second memory 120 in which the predetermined code is stored. The processor 130 may not execute the reading or writing with respect to the corresponding area by accessing the area in which the predetermined code is stored, and abnormal access or malicious hacking through external paths may also be blocked by the snoop 140.

Figure 8:
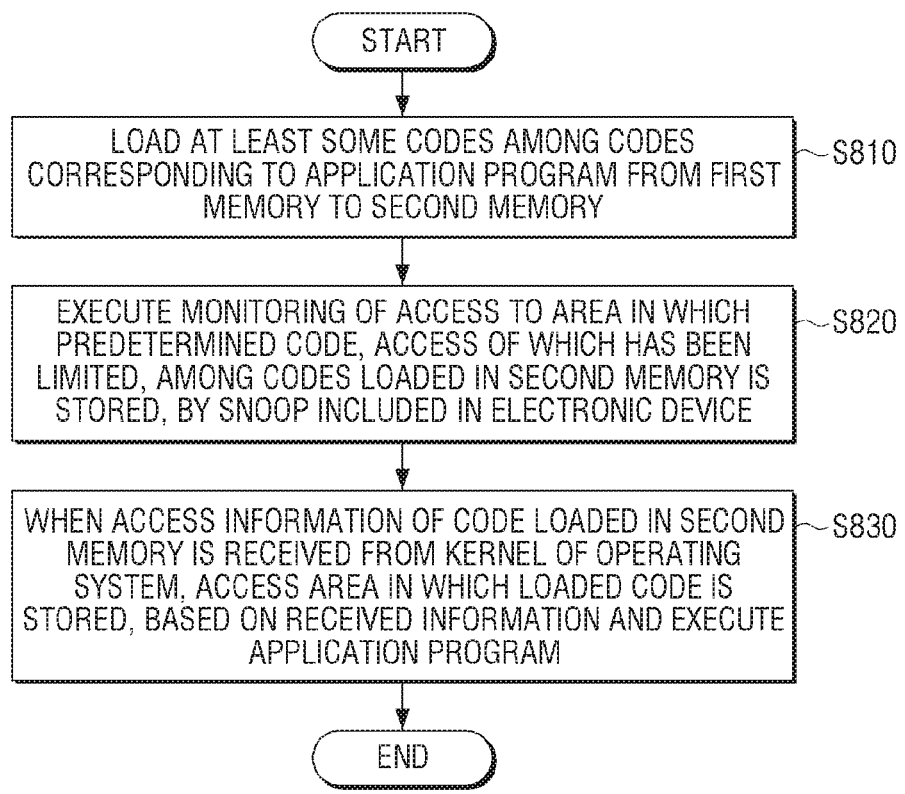
FIG. 8 is a flowchart for describing a control method of the electronic device according to an embodiment.

FIG. 8 is a flowchart for describing a control method of the electronic device according to an embodiment of the disclosure.

First, at least some codes among codes corresponding to an application program are loaded from a first memory to a second memory (S810).

The monitoring of access to an area in which a predetermined code, the access to which by a kernel of an operating system has been limited, among the codes loaded in the second memory is stored is executed by a snoop included in the electronic device (S820).

When access information of the codes loaded in the second memory is received from the kernel of the operating system, an application program is executed by accessing the area in which the loaded code is stored based on the received information (S830).

The step S830 of executing the application program includes a step of, based on a first command indicating a start of the predetermined code being executed, transmitting a first control signal for stopping the monitoring the access to the area in the second memory in which the predetermined code is stored to the snoop.

In the step S830 of executing the application program, when a second command indicating an end of the predetermined code is executed, a second control signal for restarting the monitoring the access to the area in which the predetermined code is stored may be transmitted to the snoop.

The step S830 of executing the application program may include a step of, based on the access to the area in which the predetermined code is stored being executed according to the stop of the monitoring of the access to the area in which the predetermined code is stored, storing data corresponding to the area in which the predetermined code is stored in a cache memory, and a step of, based on the second command being executed, removing the data stored in the cache memory.

The step S830 of executing the application program may include a step of, based on a switching code for mode switching being received from the kernel of the operating system according to the execution of the first command in a first execution mode based on the operating system, switching the first execution mode to a second execution mode based on a secure operating system (OS), and a step of transmitting the first control signal to the snoop in the second execution mode.

The switching code may be a secure monitor call (SMC) command executed in the kernel of the operating system, and the step of switching to the second execution mode may include a step of transmitting the SMC command to a virtual monitor module operating in the second execution mode by the kernel of the operating system, and a step of, based on the SMC command being received, switching the first execution mode to the second execution mode by the virtual monitor module.

The SMC command may include a control signal for transmitting the first control signal to the snoop, and the step of transmitting the first control signal to the snoop may include a step of, based on the control signal being received by a snoop driver module operating in the second execution mode, transmitting the first control signal to the snoop based on the control signal.

According to an embodiment of the disclosure, the step S830 of executing the application program may include a step of, based on a switching code for mode switching being received from the kernel of the operating system according to execution of a second command indicating an end of the predetermined code in a first execution mode based on the operating system, switching the first execution mode to a second execution mode based on a secure operating system (OS), and a step of transmitting a second control signal for restarting the monitoring the access to the area in which the predetermined code is stored to the snoop in the second execution mode.

According to an embodiment of the disclosure, in the step S820 of executing the monitoring, when the access to the area in which the predetermined code is stored is detected before the first control signal is received by the snoop, the access may be blocked or a log regarding the access may be generated.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may execute one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising:
a first memory storing an operating system, and an application program for execution in the operating system;
a second memory;
a processor configured to:
load some codes among codes corresponding to the application program from the first memory to the second memory, and
based on access information of the codes loaded in the second memory being received from a kernel of the operating system, execute the application program by accessing an area in which the loaded codes are stored, based on the received information; and
a snoop configured to monitor access to an area in which a predetermined code, the access to which has been limited, among the codes loaded in the second memory is stored,
wherein the processor is further configured to:
based on a first command indicating a start of the predetermined code being executed, transmit a first control signal for stopping the monitoring the access to the area in the second memory in which the predetermined code is stored, to the snoop,
based on the access to the area in which the predetermined code is stored being executed according to the stop of the monitoring the access to the area in which the predetermined code is stored, store data corresponding to the area in which the predetermined code is stored, in a cache memory included in the processor, and
based on a second command indicating an end of the predetermined code being executed, transmit a second control signal for restarting the monitoring the access to the area in which the predetermined code is stored, to the snoop, and remove the data stored in the cache memory.

2. The device according to claim 1, wherein the processor is configured to:
operate in a first execution mode based on the operating system or a second execution mode based on a secure operating system (OS),
based on a switching code for mode switching being received from the kernel of the operating system according to the execution of the first command in the first execution mode, switch the first execution mode to the second execution mode, and
transmit the first control signal to the snoop in the second execution mode.

3. The device according to claim 2, wherein the switching code is a secure monitor call (SMC) command executed in the kernel of the operating system,
wherein the kernel of the operating system transmits the SMC command to a virtual monitor module operating in the second execution mode, and wherein the virtual monitor module is configured to, based on the SMC command being received, switch the first execution mode to the second execution mode.

4. The device according to claim 3, wherein the SMC command comprises a control signal for transmitting the first control signal to the snoop, and
wherein a snoop driver module operating in the second execution mode is configured to, based on the control signal being received, transmit the first control signal to the snoop based on the control signal.

5. The device according to claim 1, wherein the processor is configured to:
operate in a first execution mode based on the operating system or a second execution mode based on a secure operating system (OS),
based on a switching code for mode switching being received from the kernel of the operating system according to execution of the second command indicating an end of the predetermined code in the first execution mode, switch the first execution mode to the second execution mode, and
transmit the second control signal for restarting the monitoring the access to the area in which the predetermined code is stored to the snoop in the second execution mode.

6. The device according to claim 1, wherein the snoop is configured to, based on the access to the area in which the predetermined code is stored being detected before the first control signal is received from the processor, block the access or generate and store a log regarding the access.

7. A control method of an electronic device comprising a first memory storing an operating system, and an application program for execution in the operating system, and a second memory, the method comprising:
loading some codes among codes corresponding to the application program from the first memory to the second memory;
monitoring access to an area in which a predetermined code, the access to which has been limited, among the codes loaded in the second memory is stored, by a snoop included in the electronic device; and
based on access information of the codes loaded in the second memory being received from a kernel of the operating system, executing the application program by accessing the area in which the loaded codes are stored based on the received information,
wherein the executing the application program further comprises:
based on a first command indicating a start of the predetermined code being received, transmitting a first control signal for stopping the monitoring the access to the area in the second memory in which the predetermined code is stored to the snoop;
based on the access to the area in which the predetermined code is stored being executed according to the stop of the monitoring of the access to the area in which the predetermined code is stored, storing data corresponding to the area in which the predetermined code is stored in a cache memory;
based on a second command indicating an end of the predetermined code being executed, transmitting a second control signal for restarting the monitoring the access to the area in which the predetermined code is stored to the snoop; and
based on the second command being executed, removing the data stored in the cache memory.

8. The method according to claim 7, wherein the executing the application program comprises:
based on a switching code for mode switching being received from the kernel of the operating system according to the execution of the first command in a first execution mode based on the operating system, switching the first execution mode to a second execution mode based on a secure operating system (OS); and
transmitting the first control signal to the snoop in the second execution mode.

9. The method according to claim 8, wherein the switching code is a secure monitor call (SMC) command executed in the kernel of the operating system, and
wherein the switching to the second execution mode comprises:
transmitting the SMC command to a virtual monitor module operating in the second execution mode by the kernel of the operating system; and
based on the SMC command being received, switching the first execution mode to the second execution mode by the virtual monitor module.

10. The method according to claim 9, wherein the SMC command comprises a control signal for transmitting the first control signal to the snoop, and
wherein the transmitting the first control signal to the snoop comprises, based on the control signal being received by a snoop driver module operating in the second execution mode, transmitting the first control signal to the snoop based on the control signal.

11. The method according to claim 7, wherein the executing the application program comprises:
based on a switching code for mode switching being received from the kernel of the operating system according to execution of the second command indicating an end of the predetermined code in a first execution mode based on the operating system, switching the first execution mode to a second execution mode based on a secure operating system (OS); and
transmitting the second control signal for restarting the monitoring the access to the area in which the predetermined code is stored to the snoop in the second execution mode.

* * * * *